(12) United States Patent
Iwamoto et al.

(10) Patent No.: US 11,498,151 B2
(45) Date of Patent: Nov. 15, 2022

(54) SINGLE SIDE HEATING APPARATUS

(71) Applicant: DENGENSHA TOA CO., LTD., Kanagawa (JP)

(72) Inventors: Yoshiaki Iwamoto, Kanagawa (JP); Shuhei Saeki, Kanagawa (JP)

(73) Assignee: Dengensha Toa Co., Ltd., Kanagawa (JP)

( * ) Notice: Subject to any disclaimer, the term of this patent is extended or adjusted under 35 U.S.C. 154(b) by 396 days.

(21) Appl. No.: 16/640,279

(22) PCT Filed: Jun. 28, 2019

(86) PCT No.: PCT/JP2019/025844
§ 371 (c)(1),
(2) Date: Feb. 19, 2020

(87) PCT Pub. No.: WO2020/225927
PCT Pub. Date: Nov. 12, 2020

(65) Prior Publication Data
US 2021/0138575 A1 May 13, 2021

(30) Foreign Application Priority Data
May 7, 2019 (JP) .............................. JP2019-087258

(51) Int. Cl.
*B23K 11/30* (2006.01)
*B23K 11/31* (2006.01)
(Continued)

(52) U.S. Cl.
CPC .......... *B23K 11/318* (2013.01); *B23K 11/317* (2013.01); *B23K 11/115* (2013.01); *B23K 2101/38* (2018.08)

(58) Field of Classification Search
CPC ...... B23K 9/0017; B23K 9/12; B23K 9/1675; B23K 9/28–282; B23K 37/02;
(Continued)

(56) References Cited

U.S. PATENT DOCUMENTS

| 2,979,599 | A | * | 4/1961 | Width | B23K 11/312 |
| | | | | | 219/161 |
| 4,334,138 | A | * | 6/1982 | Matsuno | B23K 11/063 |
| | | | | | 219/83 |

(Continued)

FOREIGN PATENT DOCUMENTS

| JP | S62-158577 A | 7/1987 |
| JP | H05-18772 U1 | 3/1993 |

(Continued)

OTHER PUBLICATIONS

International Search Report with Written Opinion by ISA/JP dated Sep. 24, 2019, on PCT/JP2019/025844 (JA: 10 pages).

*Primary Examiner* — Michael A Laflame, Jr.
(74) *Attorney, Agent, or Firm* — The Marbury Law Group PLLC

(57) ABSTRACT

A single side heating apparatus equipped with a pair of electrodes for heating a workpiece is provided. The apparatus includes: a base portion; the pair of electrodes each having a contact portion configured to contact with the workpiece in one direction continuously or at a plurality of spaced-apart portions thereof; an electrode holder, to which the pair of electrodes are fixed; and a four-bar linkage provided between the base portion and the electrode holder and configured to rotate to tilt the electrode holder around an axis orthogonal to the one direction by a reaction force received by the electrodes from the workpiece. The four-bar linkage includes a first link located closer to the electrode holder, a second link located closer to the base portion, and third and fourth links. The first link is shorter than the second link, and the third link and the fourth link are equal in length.

8 Claims, 13 Drawing Sheets

(51) Int. Cl.
*B23K 101/38* (2006.01)
*B23K 11/11* (2006.01)

(58) Field of Classification Search
CPC .............. B23K 11/06; B23K 11/30–31; B23K 11/31–312; B23K 11/317
See application file for complete search history.

(56) References Cited

U.S. PATENT DOCUMENTS

| | | | |
|---|---|---|---|
| 5,285,043 A * | 2/1994 | Smith | B23K 11/312 |
| | | | 219/87 |
| 5,948,284 A * | 9/1999 | Copeman | B25B 5/087 |
| | | | 219/86.33 |
| 10,099,312 B2 * | 10/2018 | Voigt | B23K 11/318 |
| 2005/0087359 A1 | 4/2005 | Tachibana et al. | |
| 2005/0263495 A1 * | 12/2005 | Kon | B23K 11/31 |
| | | | 219/86.24 |
| 2015/0122782 A1 * | 5/2015 | Voigt | B23K 11/115 |
| | | | 219/86.33 |
| 2016/0271721 A1 * | 9/2016 | Watanabe | B23K 35/40 |
| 2019/0358910 A1 | 11/2019 | Yoshiaki et al. | |

FOREIGN PATENT DOCUMENTS

| | | |
|---|---|---|
| JP | 2003-80371 A | 3/2003 |
| JP | 2010-105008 A | 5/2010 |
| WO | WO 03/085787 A1 | 10/2003 |
| WO | WO 2018/220892 A1 | 12/2018 |

\* cited by examiner

SINGLE SIDE HEATING APPARATUS

RELATED APPLICATIONS

This application is a national phase entry of international patent application PCT/JP2019/025844 filed Jun. 28, 2019, which claims benefit of priority to Japanese Application Serial No. 2019-087258, filed May 7, 2019, the entire disclosures of which are incorporated herein by reference in their entireties.

TECHNICAL FIELD

The present invention relates to a single side heating apparatus.

BACKGROUND ART

A conventional welding apparatus, as an example, is disclosed in Patent Literature Document 1. Patent Literature Document 1 discloses that a gun attachment block having a lower end, to which electrodes are attached, is caused to slide on an arc along an arch-shaped guide rail. The position to which the gun attachment block slides is controlled by driving a motor.

CITATION LIST

Patent Literature Document(s)

Patent Literature Document 1: JP-S62-158577A

SUMMARY OF THE INVENTION

Technical Problem

A single side heating apparatus equipped with a pair of electrodes for heating a workpiece from one side of the workpiece is known; each of the electrodes may include a linear contact portion, through which the electrode makes a line contact with the workpiece. When the electrode of this type comes into contact with the workpiece such that the linear contact portion obliquely contacts with the surface of the workpiece, the electrode makes a point contact with the workpiece, which disadvantageously leads to heating failure. The technique disclosed in Patent Literature Document 1 is to control the position of the electrodes by controlling the motor, and it is thus difficult for this technique to make the line contact portion of the electrode line contact with the workpiece in an accurate manner.

There is also known a structure for making a line contact portion in line contact with a surface of a workpiece, in which structure an electrode is rotated by passively swinging the attachment portion for the electrode in accordance with a reaction force received by the electrode from the workpiece. However, in this conventional structure, the center of swinging motion, that is the center of rotation of the electrode, is spaced apart upward from the electrode, so that the line contact portion swings or rotatively displaces to a large extent in a direction in which the line contact portion extends. If the rotative displacement in the extension direction is large, one end of the line contact portion may get stuck on the workpiece without smoothly sliding on the surface of the workpiece, so that the electrode remains point-contacting with the workpiece.

To solve the problem as described above, the present invention seeks to provide a single side heating apparatus which can make a contact portion of an electrode properly contact with the workpiece.

Solution to Problem

To solve the above problem, the present invention seeks to provide a single side heating apparatus equipped with a pair of electrodes for heating a workpiece from one side of the workpiece, the apparatus comprising: a base portion; the pair of electrodes each having a contact portion configured to contact with the workpiece in one direction continuously or at a plurality of spaced-apart portions thereof; an electrode holder, to which the pair of electrodes are fixed; and a four-bar linkage provided between the base portion and the electrode holder and configured to rotate to tilt the electrode holder around an axis orthogonal to the one direction by a reaction force received by the electrodes from the workpiece, wherein the four-bar linkage comprises a first link located closer to the electrode holder, a second link located closer to the base portion, a third link, and a fourth link, the first link being shorter than the second link, and the third link and the fourth link being equal in length.

According to the present invention, the following operation and advantageous effects can be achieved.

If a contact portion is oriented obliquely with respect to the surface of the workpiece and one end of the contact portion makes a point contact with the workpiece, the center of rotation of the electrode is located proximate to the contact portion, so that the one end of the contact portion displaces in the upper-lower direction only, that is substantially the same as the pressing direction. This makes it possible to make the contact portion properly contact with the workpiece without the one end of the contact portion getting stuck on the surface of the workpiece.

Advantageous Effects of the Invention

According to the present invention, it is possible to make a contact portion of an electrode properly contact with a workpiece.

DESCRIPTION OF EMBODIMENTS

Two embodiments of a single side heating apparatus according to the present invention will be described below. In the following description, an upper-lower direction refers to the direction in a state in which a base portion is located at an upper side and electrodes are located at a lower side.

Figure 1A:
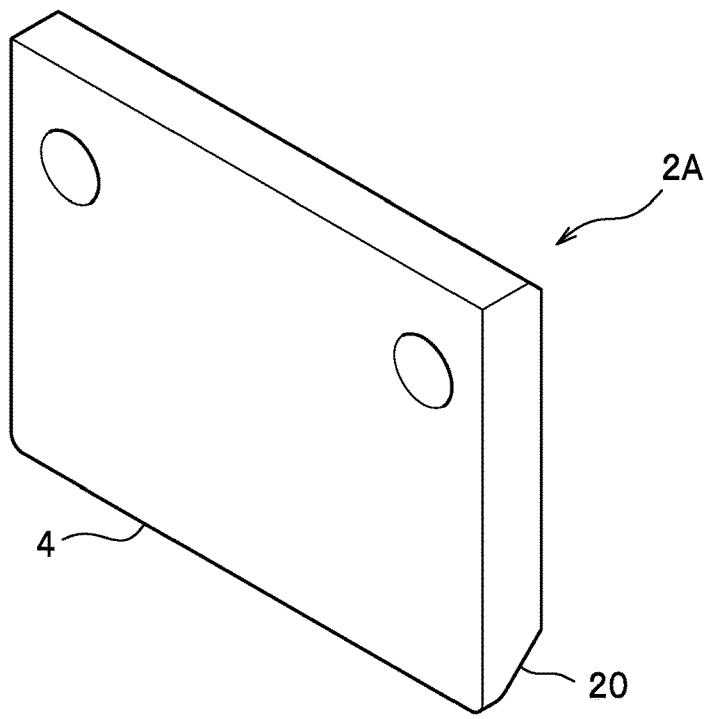
FIG. 1A is a perspective view of an exterior of an electrode having a contact portion that extends continuously in one direction.
Figure 1B:
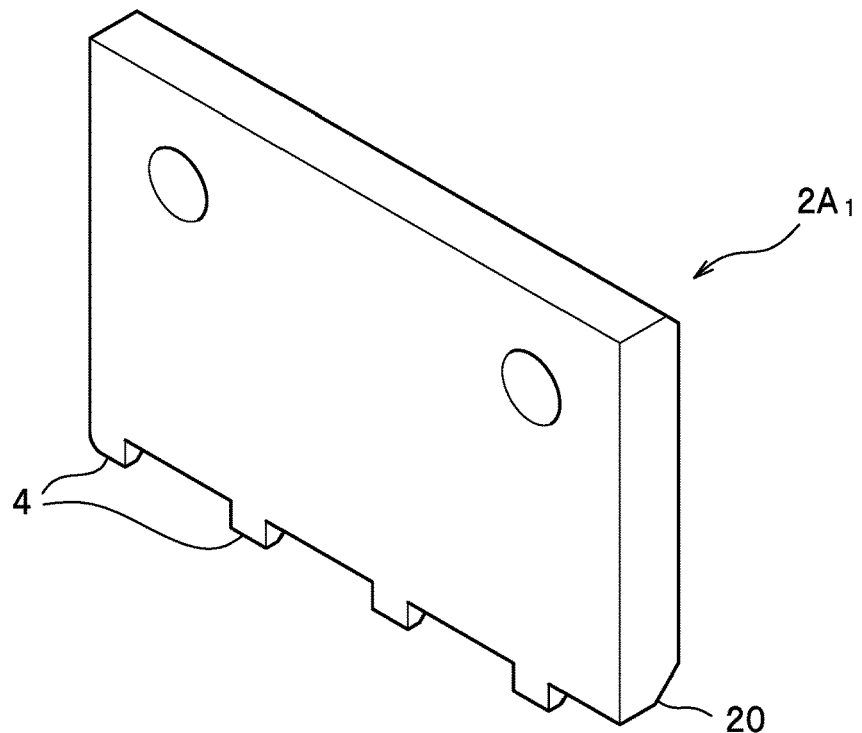
FIG. 1B is a perspective view of an exterior of an electrode having a comb-shaped contact portion.

First, a shape of electrodes and a principle of joining workpieces will be described. A single side heating apparatus according to the present invention includes a pair of electrodes for heating a workpiece from one side of the workpiece. The pair of electrodes have the same shape. FIG. 1 shows two examples of an electrode, each of which has a contact portion in a different shape. An electrode 2A shown in FIG. 1A has a rectangular flat-plate shape. The electrode 2A has a lower end portion on which an inclined surface 20 inclined in the thickness direction of the electrode 2A is formed, and the lowermost end of the inclined surface 20 forms a contact portion 4 to be in contact with a workpiece. The contact portion 4 is formed to extend continuously in one direction to provide a single continuous contact surface. Meanwhile, the electrode $2A_1$ shown in FIG. 1B has a contact portion 4 in the shape of a comb. In other words, the contact portion 4 has a plurality of spaced-apart portions extending in one direction with a gap interposed between two adjacent spaced-apart portions, so that a plurality of spaced-apart contact surfaces are provided.

Figure 2A:
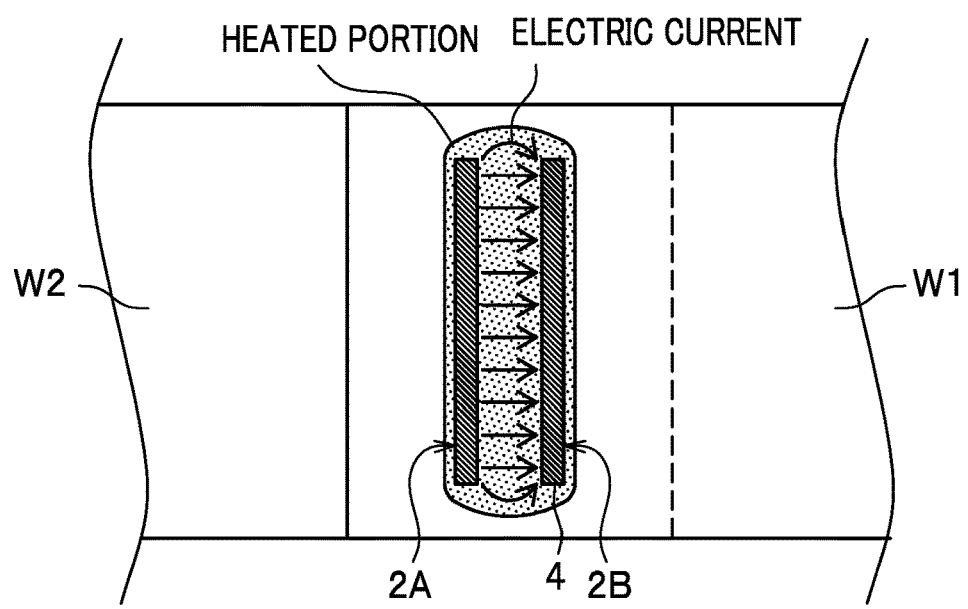
FIG. 2A is a plan view showing a state in which a pair of electrodes such as shown in FIG. 1A are brought into contact with a surface of a workpiece for heating.
Figure 2B:
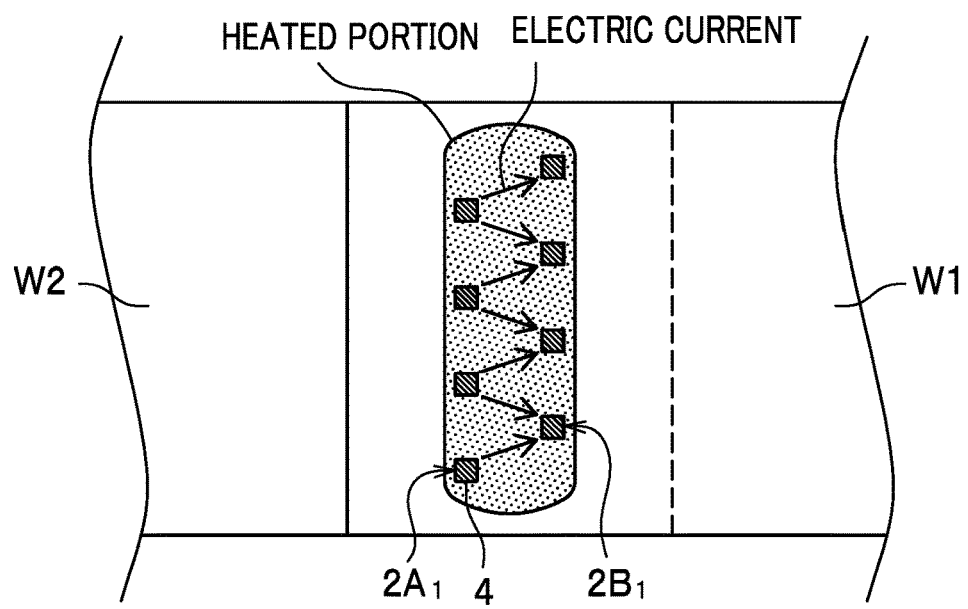
FIG. 2B is a plan view showing a state in which a pair of electrodes such as shown in FIG. 1B are brought into contact with a surface of a workpiece for heating.

FIG. 2 includes plan views showing a state in which a plate-like workpiece W1 is placed on top of a plate-like workpiece W2, and a pair of electrodes are brought into contact with the surface of the workpiece W1 for heating, in which FIG. 2A shows an example of using the electrode 2A shown in FIG. 1A, and FIG. 2B shows an example of using the comb-shaped electrode $2A_1$ shown in FIG. 1B. It should be noted that arrows shown between the electrodes indicate a flow of electric current and dotted parts indicate heated portions. In both cases, electricity flows from one electrode (each indicated by 2A, $2A_1$) to the other electrode (each indicated by 2B, $2B_1$) to heat a portion around the electrodes. In the case of the comb-shaped electrodes $2A_1$, $2B_1$ of FIG. 2B, since the contact area between the electrodes and the workpiece is smaller as compared with that of FIG. 2A, the electric current density is high and less heat is absorbed by the electrodes. This makes effectively heating the workpiece.

Figure 3A:
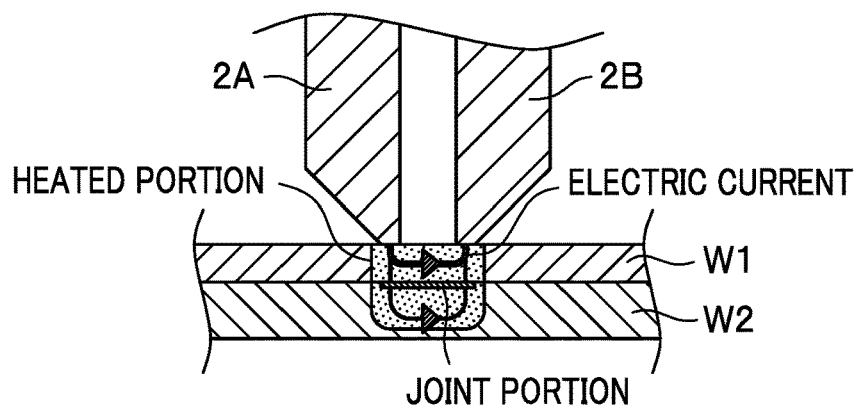
FIG. 3A is a side sectional view showing a state in which two workpieces, each made of an electric conductor, are placed one on top of another, and a pair of electrodes are brought into contact with a surface of one workpiece for heating.
Figure 3B:
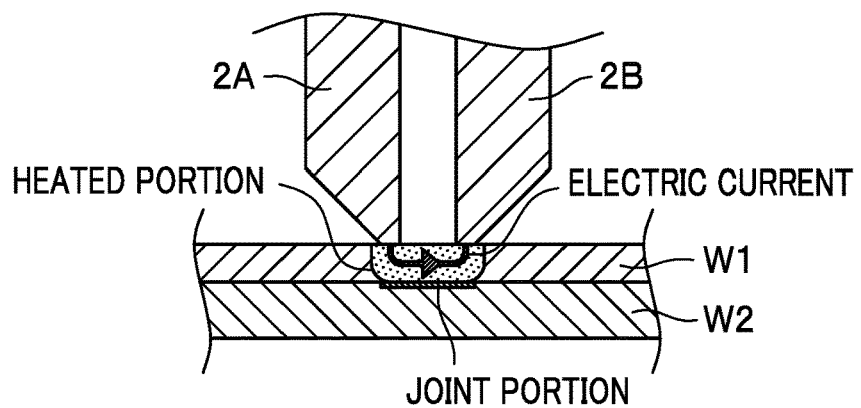
FIG. 3B is a side sectional view showing a state in which a workpiece made of an electric conductor is placed on a workpiece made of an electrical insulator, and a pair of electrodes are brought into contact with a surface of the conductive workpiece for heating.
Figure 3C:
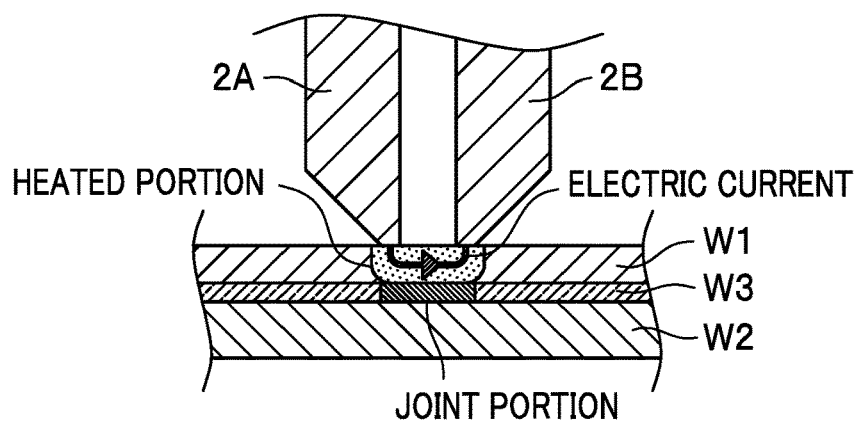
FIG. 3C is a side sectional view showing a state in which a workpiece made of an electric conductor is placed on a workpiece made of an electric conductor or an electrical insulator with an adhesive layer interposed therebetween, and a pair of electrodes are brought into contact with a surface of the conductive workpiece for heating.

FIG. 3 includes side sectional views showing a state in which the workpiece W1 is placed on top of the workpiece W2, and the pair of electrodes 2A, 2B are brought into contact with the surface of the workpiece W1, in which FIG. 3A shows the workpieces W1, W2 each made of an electric conductor, FIG. 3B shows the workpiece W1 made of an electric conductor and the workpiece W2 made of an electrical insulator, and FIG. 3C shows an adhesive layer W3, such as adhesive film and thermosetting resin-based adhesive, interposed between the workpiece W1 and the workpiece W2. It should be noted that in FIG. 3, arrows shown between the electrodes indicate a flow of electric current, dotted parts indicate heated portions, and hatched parts each provided between the workpieces W1, W2 indicate joint portions.

The single side heating apparatus according to the present invention is an apparatus for joining together the workpiece W1 made of an electric conductor and the workpiece W2 made of either an electric conductor or an electrical insulator; the single side heating apparatus is configured to press the electrodes 2A, 2B against the workpiece W1, and either to cause electricity to flow from the electrode 2A to the electrode 2B through the workpiece W1 and the workpiece W2 as shown in FIG. 3A, or to cause electricity to flow from the electrode 2A to the electrode 2B through the workpiece W1 as shown in FIG. 3B, thereby generating Joule heat. Accordingly, as seen in FIG. 3A, the single side heating apparatus 1 directly joins the workpiece W1 and the workpiece W2 together. Alternatively, as seen in FIG. 3B, the single side heating apparatus 1 joins the workpiece W1 and the workpiece W2 together by heating the workpiece W1 and thus fusing the surface of the workpiece W2. As a further alternative, as seen in FIG. 3C, the single side heating apparatus 1 is capable of joining the workpiece W1 and the workpiece W2 through an adhesive layer W3 interposed between the workpieces W1, W2. Similarly, the single side heating apparatus 1 is capable of reducing a curing time of the adhesive upon joining the workpiece W1 and the workpiece W2 through thermosetting resin-based adhesive applied as an adhesive layer W3.

The above-described operations can also be applied in the case of using the electrodes $2A_1$, $2B_1$.

A description will be given to the case of using the electrodes 2A, 2B; however, the present invention is applicable to the case of using the electrodes $2A_1$, $2B_1$.

First Embodiment

With reference to FIGS. 4 to 7, a first embodiment will be described. The single side heating apparatus 1 includes a base portion 3, a pair of electrodes 2A, 2B each having a contact portion 4 configured to contact with a workpiece W1 (see FIG. 7) continuously and linearly in one direction, electrode holders 5 to which the pair of electrodes 2A, 2B are fixed, and four-bar linkages 7.

<Base Portion 3>

The base portion 3 includes a base plate 11, a cylinder 12, and rod holders 13. The base plate 11 is a flat-plate-like member configured to be bolted to a driving member such as a robot arm with bolts (not shown). The cylinder 12 is bolted to the base plate 11 with bolts 14 and includes a cylinder case 15 in which a pair of front and rear cylinder chambers are formed, a cylinder cover 16 attached to a lower portion of the cylinder case 15, and a pair of front and rear piston rods 17 each disposed in the corresponding cylinder chamber and each having a lower end protruding downward from the cylinder cover 16. The two cylinder chambers are in communication with each other through a communicating space 18 provided above the cylinder chambers. The communicating space 18 is filled with grease.

Rod holders 13 have a flattened rectangular prism shape and are bolted to lower ends of the piston rods 17 with bolts 19. Two piston rods 17 are configured to move upward and downward to absorb a vertical position difference caused between the electrode 2A and the electrode 2B when the electrodes 2A, 2B contact with the workpiece W1.

<Electrodes 2A, 2B and Electrode Holders 5>

As seen in FIG. 1A, the electrodes 2A, 2B have a rectangular flat-plate shape, and the contact portion 4 is formed at the lowermost end of each of the inclined surfaces 20. Returning to FIGS. 4 to 7, the electrode holders 5 are substantially flat-plate-like members each of which is plane-parallel to the base plate 11; the electrode holders 5 are provided in pair such that one is disposed at the front side while the other one is disposed at the rear side. An electrode mounting seat 5A is provided at the lower surface of each electrode holder 5 to protrude downward. The electrode 2A and the electrode 2B are disposed opposite to each other such that the contact portions 4 thereof are disposed closely to each other; the electrodes 2A, 2B are bolted to the electrode mounting seats 5A with bolts 21. A pair of right and left anti-rotation members 37 are provided between the two electrode holders 5. Providing the anti-rotation members 37 can prevent the piston rods 17 from rotating around a vertical axis; in other words, the rotation of the electrodes 2A, 2B around the vertical axis can be prevented.

<Four-Bar Linkages 7>

A four-bar linkage 7 is provided between the base portion 3 and an electrode holder 5. The four-bar linkage 7 is configured to rotate to tilt the electrode holder 5 around an axis O1 orthogonal to a longitudinal direction in which the contact portion 4 extends (extension direction of the contact portion 4) by a reaction force received by the electrode 2A, 2B from the workpiece W1. The four-bar linkage 7 includes a first link base 22 provided on the base portion 3 side (i.e., provided closer to the base portion 3), a second link base 23 provided on the electrode holder 5 side (i.e., provided closer to the electrode holder 5), and a pair of links 24A, 24B.

The first link base 22 having a rectangular prim shape is bolted to the lower surface of the rod holder 13 with bolts 26 with an insulating plate 25 interposed therebetween. A link receiving chamber 27 is formed in the first link base 22; the link receiving chamber 27 opens at the lower end thereof. The second link base 23 having a rectangular prism shape is provided on the upper surface of the electrode holder 5. In this embodiment, the second link base 23 is integral with the electrode holder 5; however, the second link base 23 may be formed as a separate member. A link receiving chamber 28 is formed in the second link base 23 opposite to the link receiving chamber 27 of the first link base 22; the link receiving chamber 28 opens at an upper portion and right and left portions thereof.

The first link base 22 is provided with a pair of right and left link shafts 29, 30; the link shafts 29, 30 extend through the link receiving chamber 27 in the front-rear direction. The second link base 23 is provided with a pair of right and left link shafts 31, 32; the link shafts 31, 32 extend through the link receiving chamber 28 in the front-rear direction. One link 24A is pivotably supported by the link shaft 29 and the link shaft 31, while the other link 24B is pivotably supported by the link shaft 30 and the link shaft 32. In this embodiment, as seen in FIG. 4, the electrodes 2A, 2B are rotatable within the rotatable angle θ of approximately ±2.5°.

Figure 7:
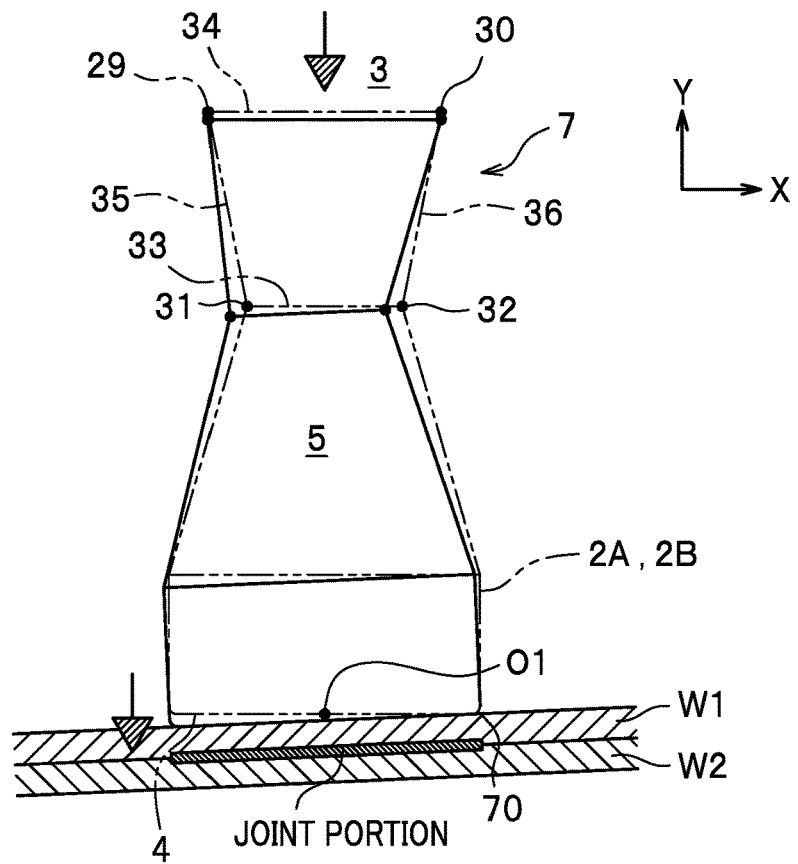
FIG. 7 is a view explaining the operation of a four-bar linkage according to the first embodiment.

Therefore, as seen in FIG. 7, the four-bar linkage 7 includes four links consisting of a first link 33 between the link shafts 31, 32 that is located closer to the electrode holder 5, a second link 34 between the link shafts 29, 30 that is located closer to the base portion 3, a third link 35 between the link shafts 29, 31, and a fourth link 36 between the link shafts 30, 32. The four-bar linkage 7 is formed to have a relationship in which the first link 33 is shorter than the second link 34 and the third link 35 and the fourth link 36 are equal in length. The axis O1 that is the center of tilting movement of the electrode 2A, 2B is located approximately at the center of the contact portion 4.

<Urging Means 8>

Figure 4:
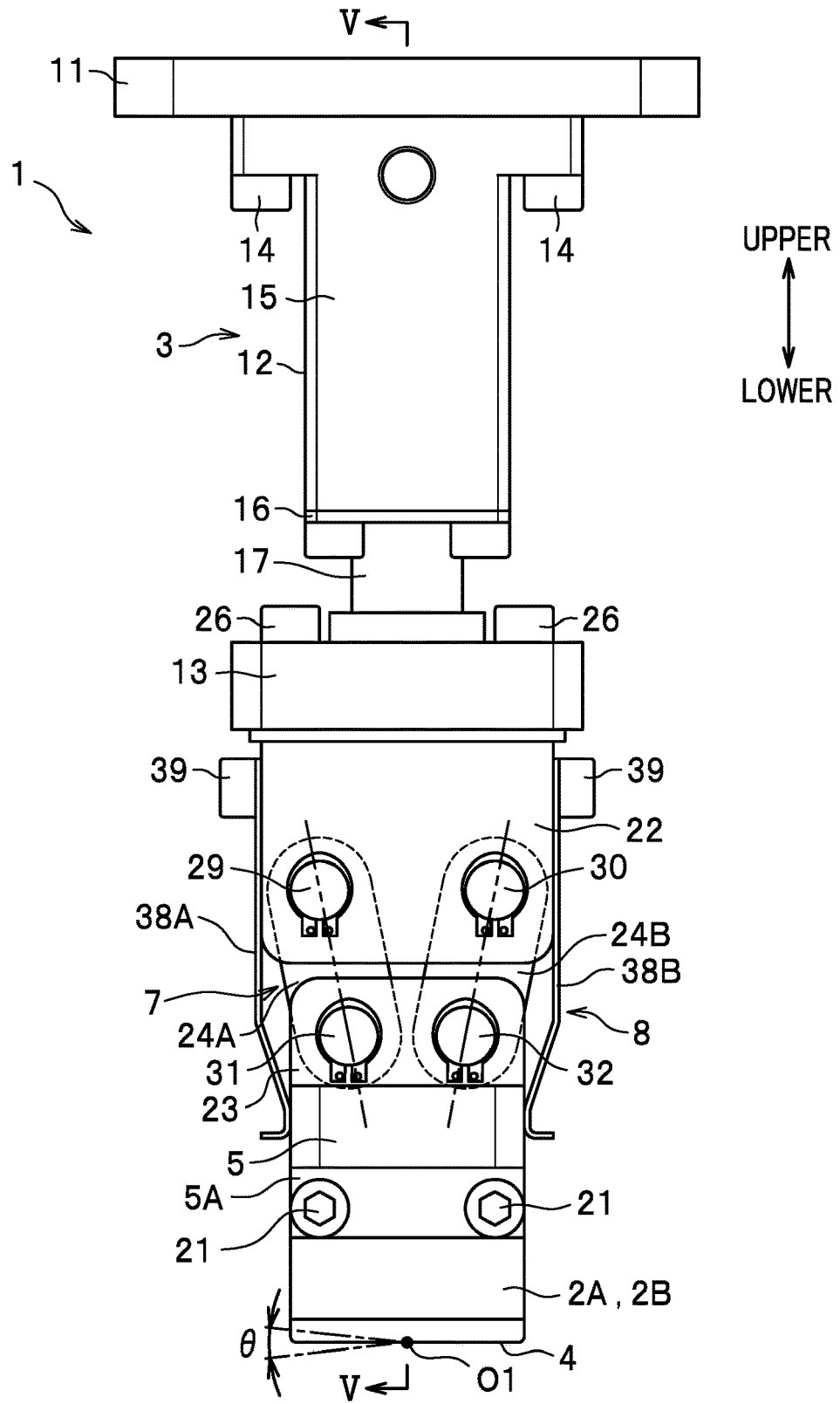
FIG. 4 is a front view of a single side heating apparatus according to the first embodiment.
Figure 5:
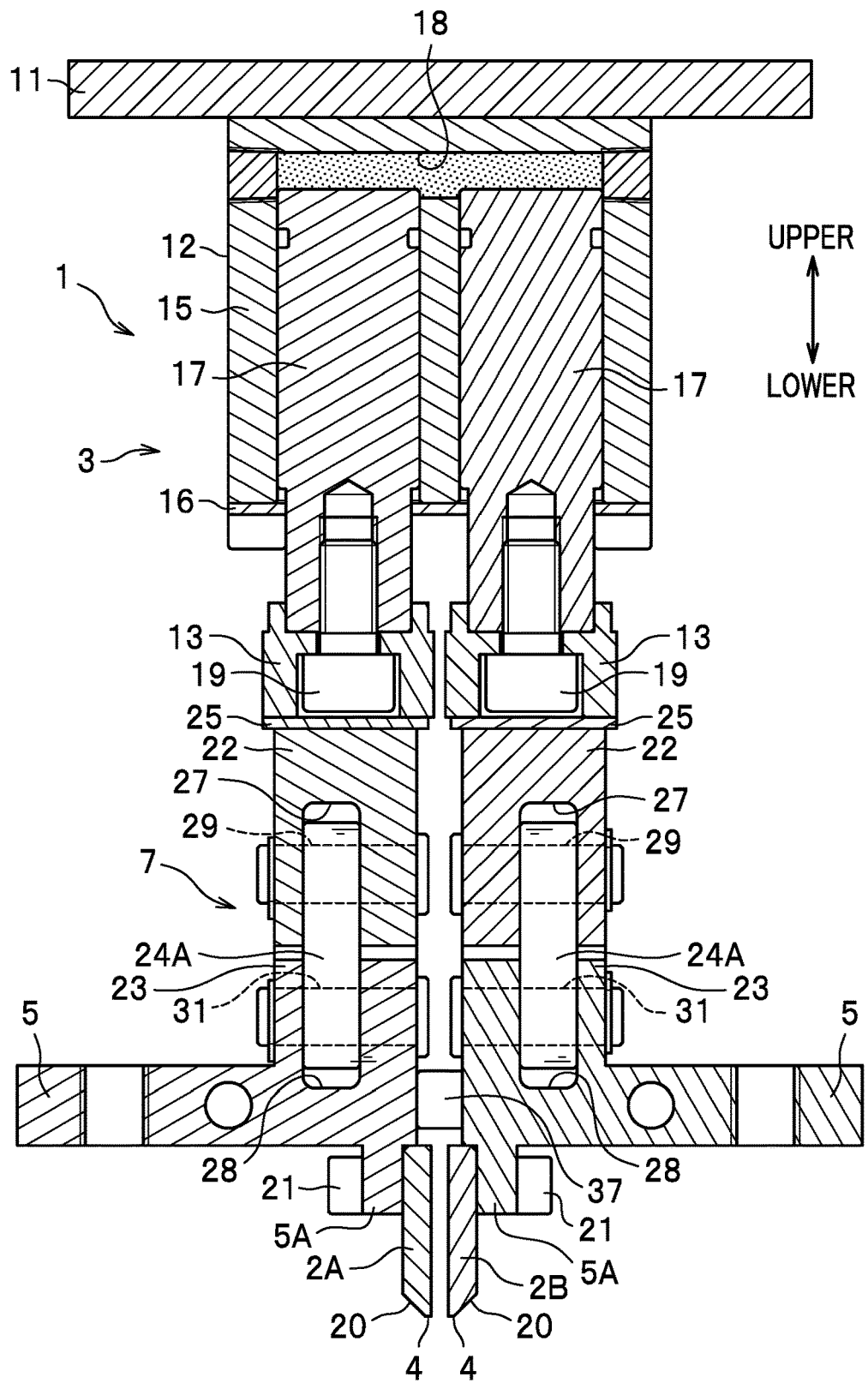
FIG. 5 is a sectional view taken along the line V-V of FIG. 4.
Figure 6:
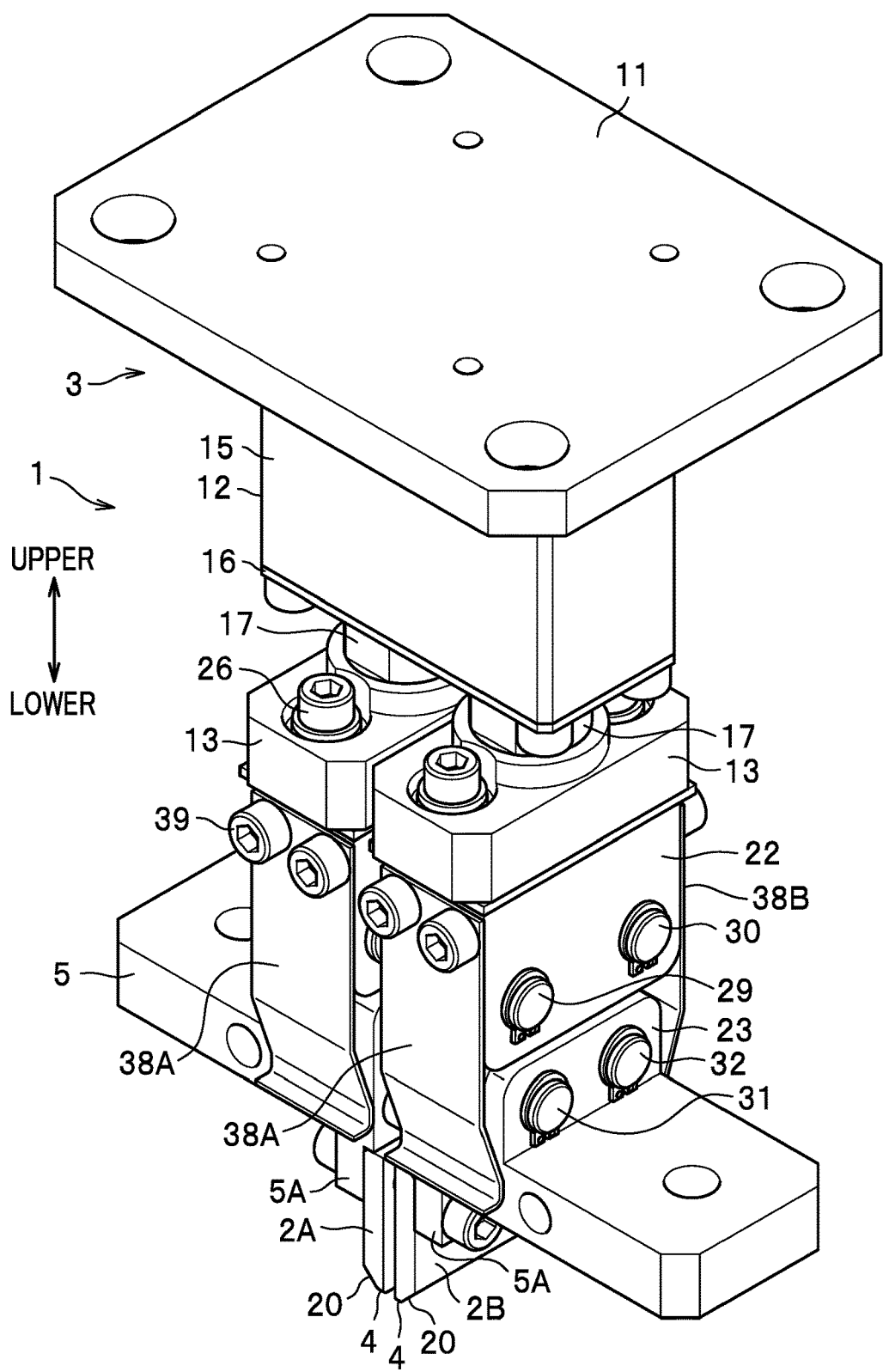
FIG. 6 is a perspective view of an exterior of the single side heating apparatus according to the first embodiment.

As seen in FIG. 4, the single side heating apparatus 1 includes an urging means 8 configured to urge an electrode holder 5 toward a standby position. The standby position is a position at which the electrode holder 5 is positioned while the contact portion 4 is not subject to a reaction force, or the position at which the contact portion 4 is oriented to extend in the right-left direction. The urging means 8 is formed of a pair of right and left plate springs 38A, 38B. The plate springs 38A, 38B are fixed to the first link base 22 by fastening the upper ends of the plate springs 38A, 38B to right and left surfaces of the first link base 22 with bolts 39. The lower ends of the plate springs 38A, 38B are free ends to hold the right and left surfaces of a second link base 23 and to urge the electrode holder 5 toward the standby position.

<Operation>

Figure 8:
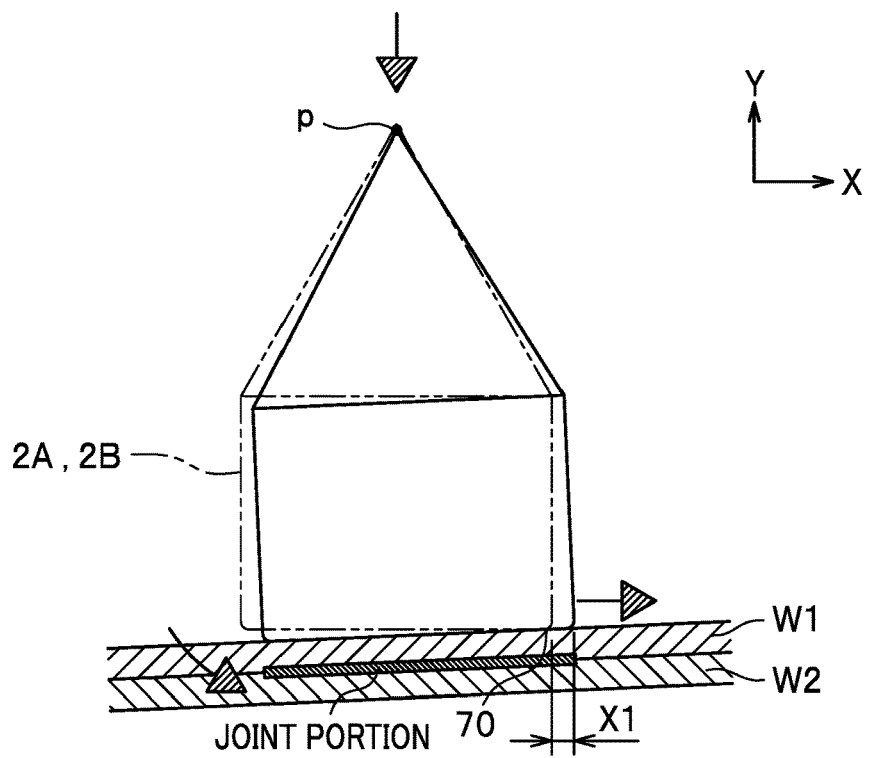
FIG. 8 is a view explaining the operation of a tilting mechanism for a conventional electrode.
Figure 9:
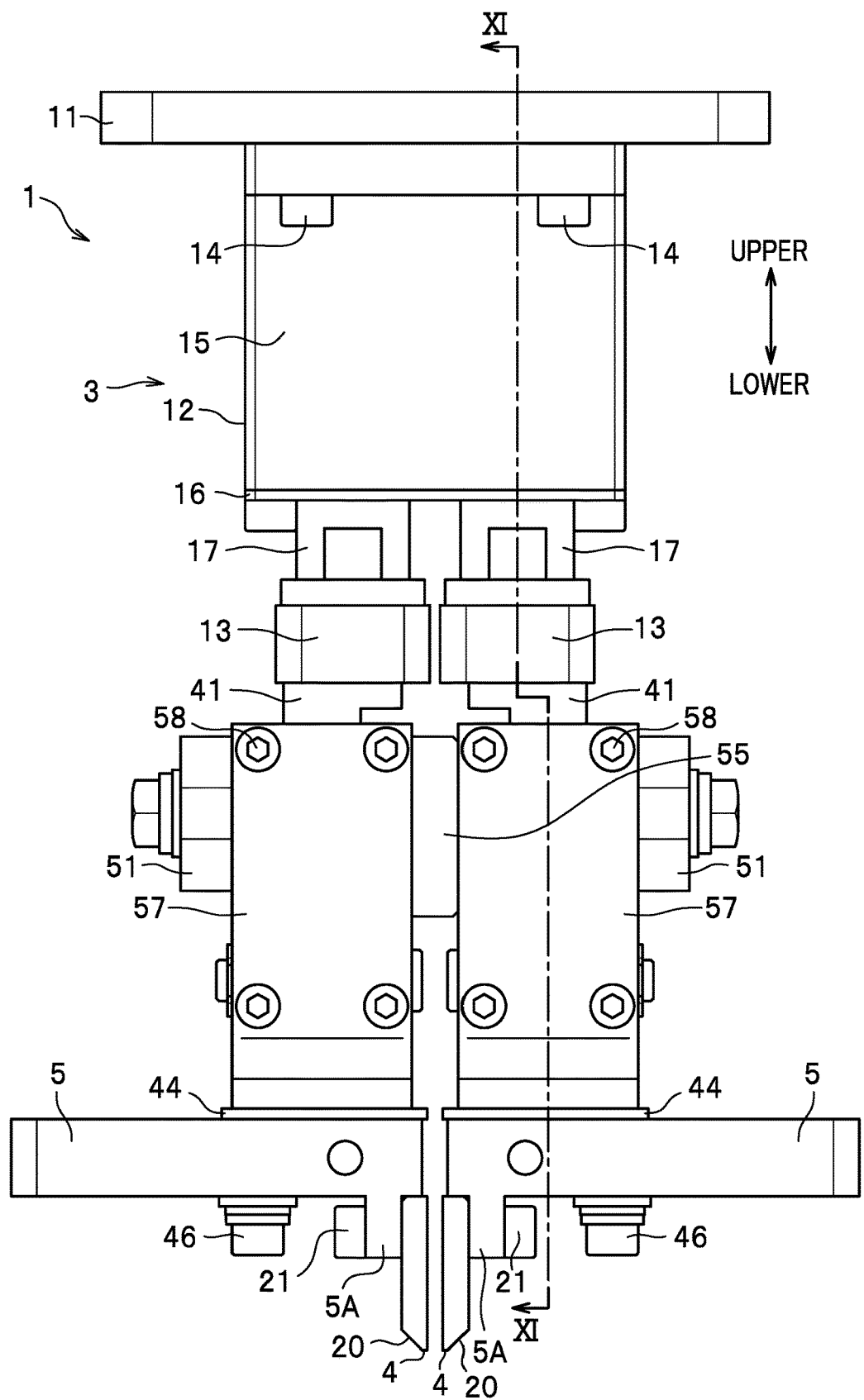
FIG. 9 is a side view of a single side heating apparatus according to the second embodiment.
Figure 10:
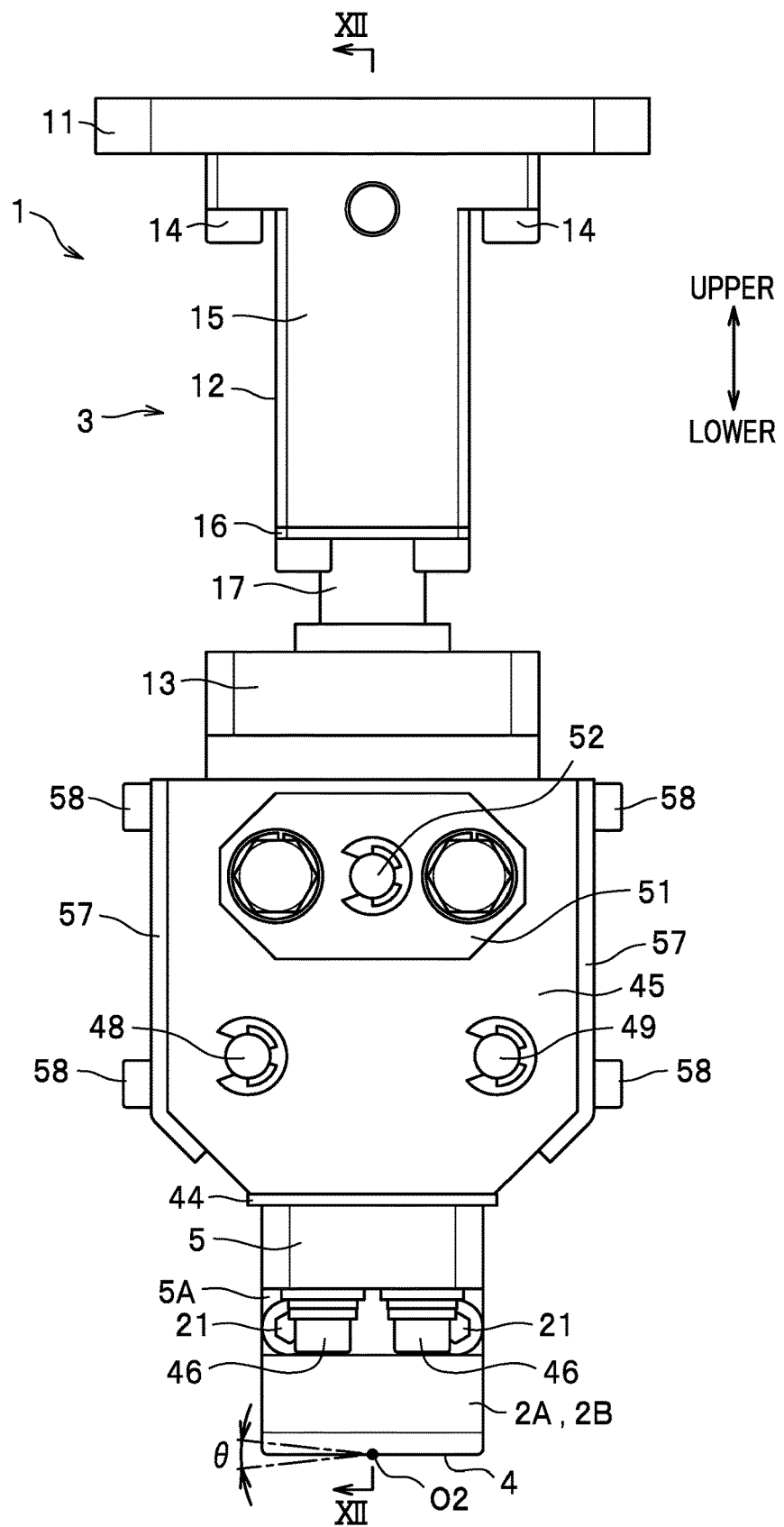
FIG. 10 is a front view of the single side heating apparatus according to the second embodiment.
Figure 11:
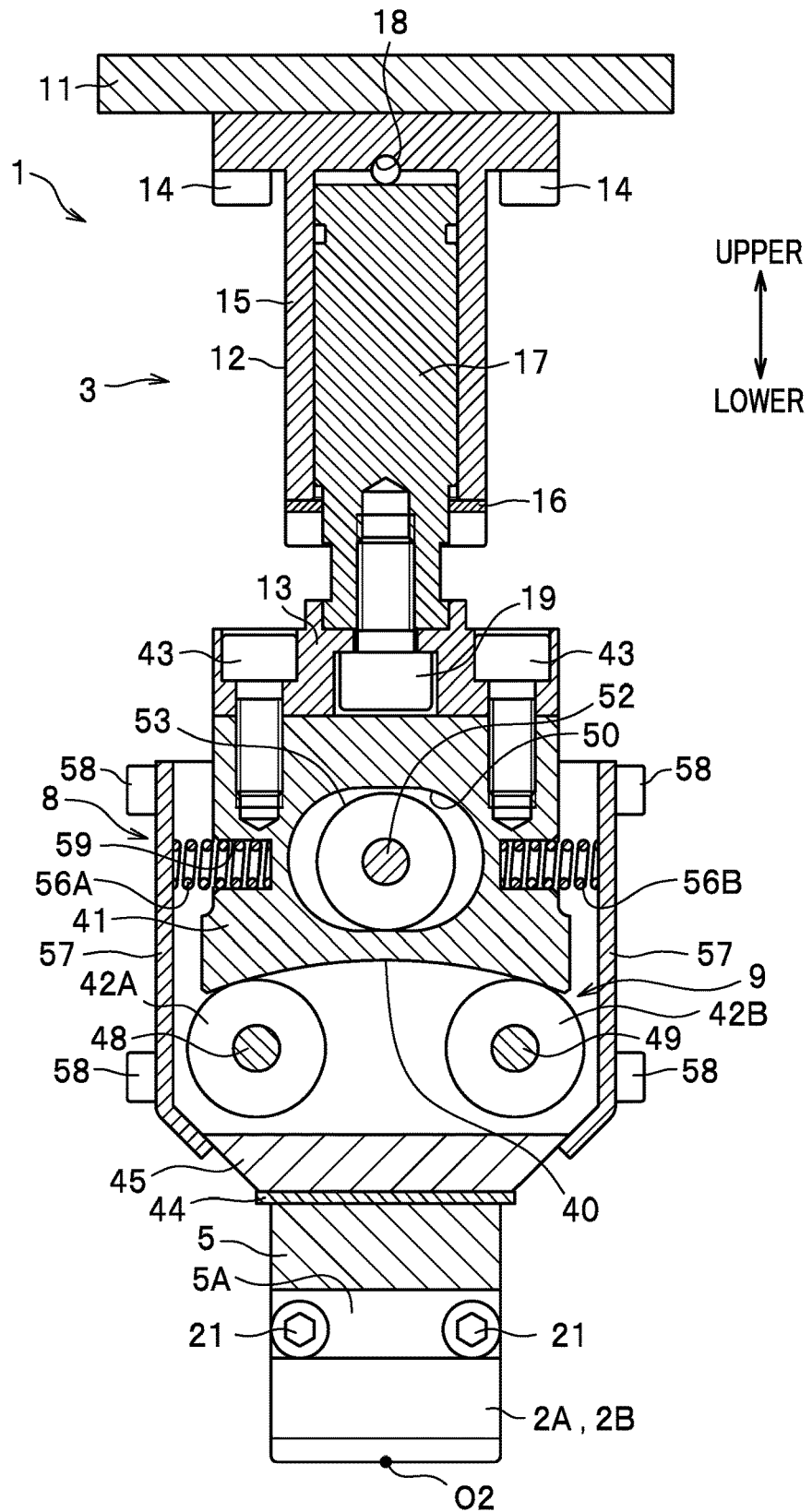
FIG. 11 is a sectional view taken along the line XI-XI of FIG. 9.
Figure 12:
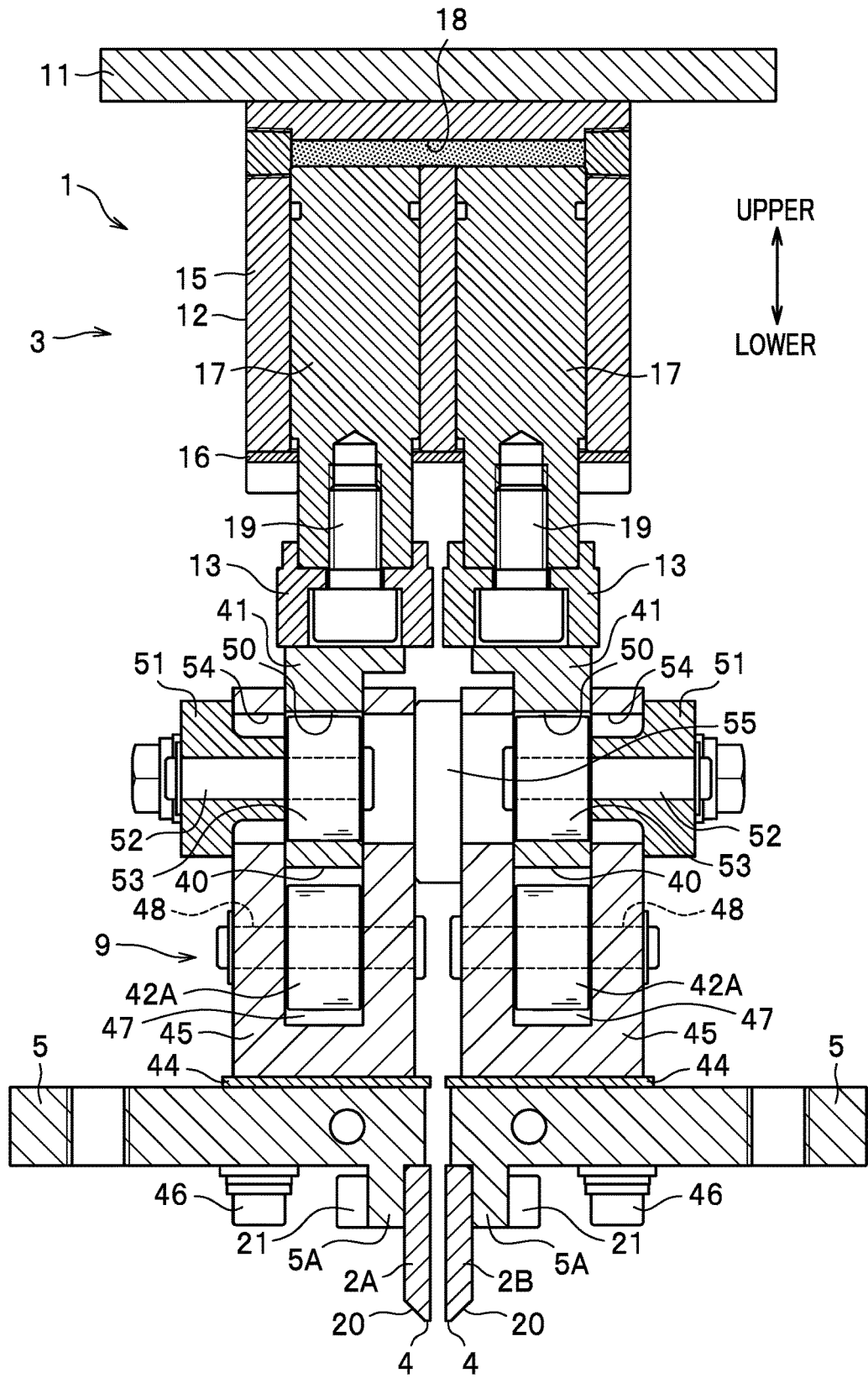
FIG. 12 is a sectional view taken along the line XII-XII of FIG. 10.
Figure 13:
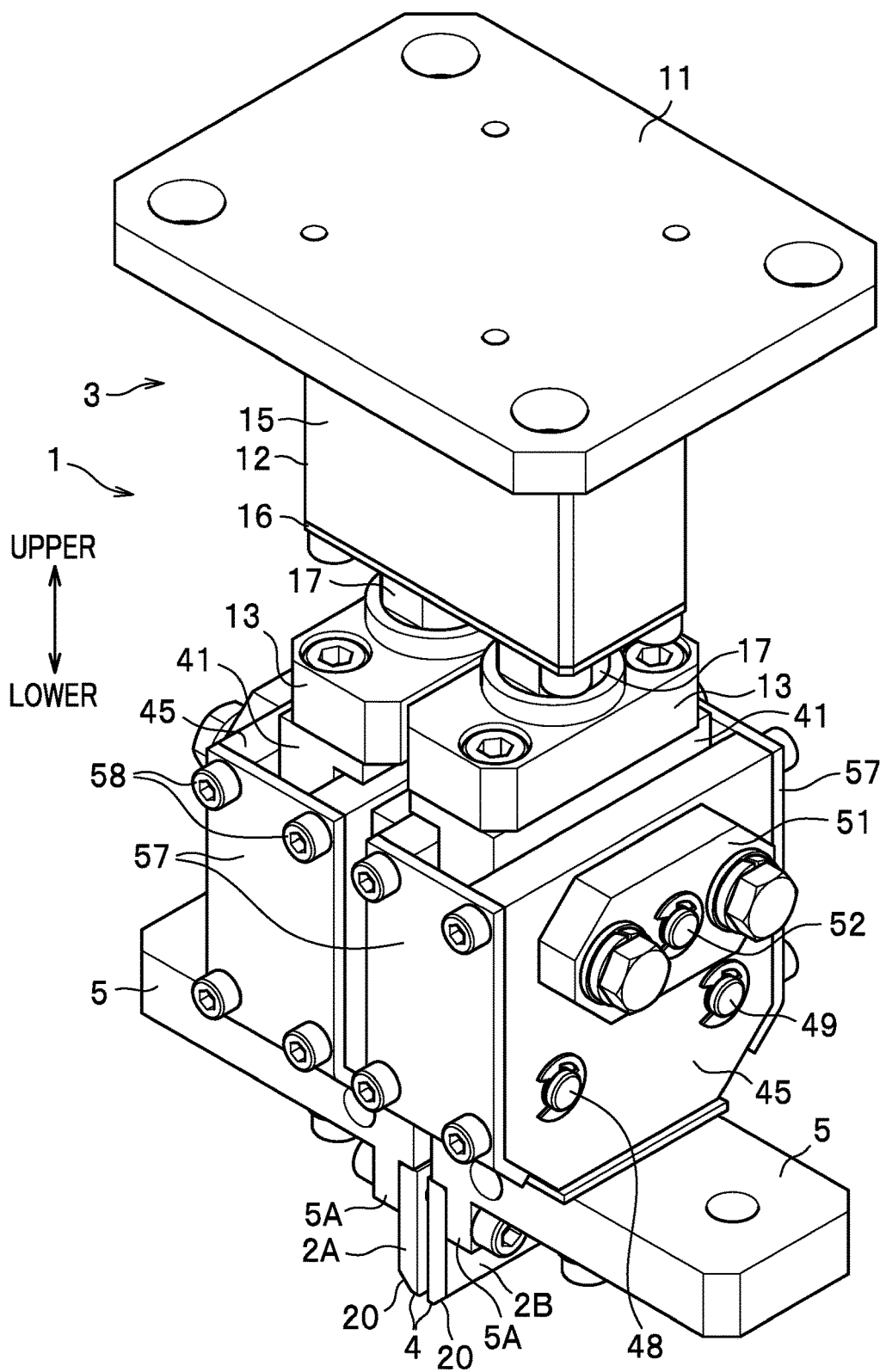
FIG. 13 is a perspective view of an exterior of the single side heating apparatus according to the second embodiment.
Figure 14:
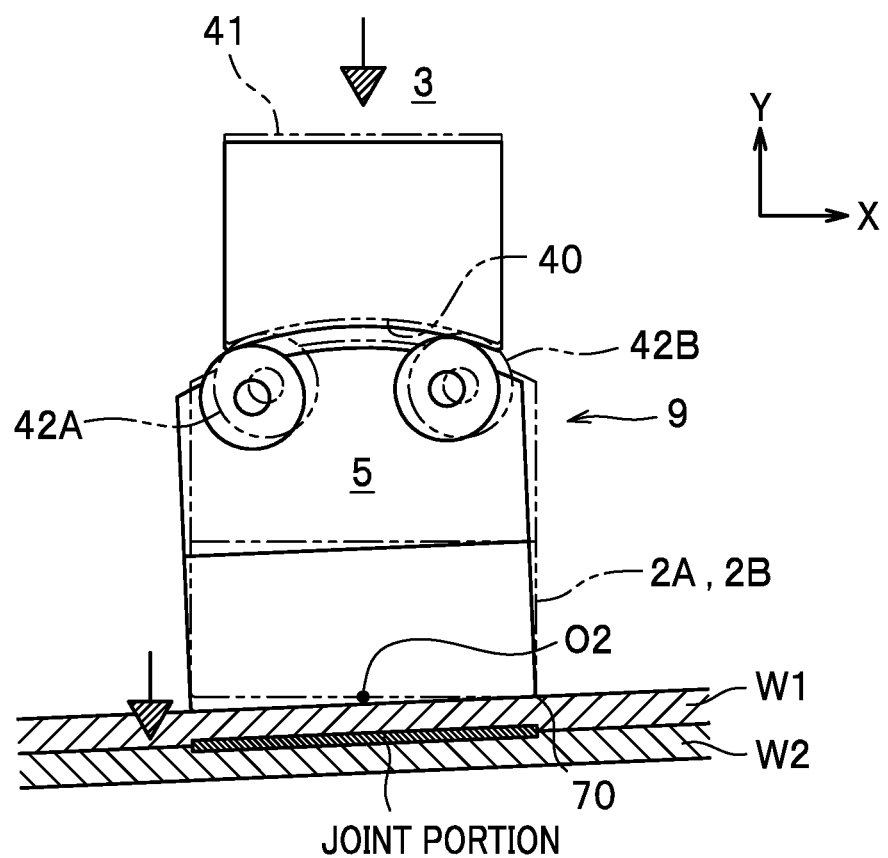
FIG. 14 is a view explaining the operation of a cam mechanism according to the second embodiment.

FIG. 7 is a view of a four-bar linkage 7 according to this embodiment, explaining the operation of an electrode 2A, 2B when it is brought into contact with the surface of the workpiece W1. FIG. 8 is a view explaining the operation of the conventional structure, as a comparative example, in which the center of rotation p of an electrode 2A, 2B is spaced apart upward. In FIG. 8, when the contact portion 4 is oriented obliquely with respect to the surface of the workpiece W1 and the right end 70 of the contact portion 4 makes a point contact with the workpiece W1, the electrode 2A, 2B tends to tilt counterclockwise in the figure, by a reaction force from the workpiece W1, from a position shown in phantom lines to a position shown in solid lines. However, since the center of rotation p is spaced apart upward from the contact portion 4, it is necessary that the contact portion 4 move in the X-axis direction by a large displacement amount X1 to cause the contact portion 4 to make a line contact with the workpiece W1. According to this conventional structure, the right end 70 may get stuck while the contact portion 4 is sliding on the surface of the workpiece W1, so that the left end of the contact portion 4 may remain non-contacting with the surface of the workpiece W1.

In contrast, according to the four-bar linkage 7 of FIG. 7, if the right end 70 receives a reaction force from the workpiece W1, the four-bar linkage 7 moves from a position shown in phantom lines to a position shown in solid lines against the urging force of the plate spring 38A (see FIG. 4). At this time, the link shaft 31 rotates around the link shaft 29 that serves as a center of rotation to move in a leftward and downward direction, while the link shaft 32 rotates around the link shaft 30 that serves as a center of rotation to move in a leftward and upward direction. Accordingly, the first link 33 displaces leftward as a whole, while the link shaft 31 is located lower than the link shaft 32, that is, inclined so that the lower side of the first link 33 faces to the right. When the first link 33 is inclined such that the lower side thereof faces to the right, the contact portion 4 disposed below and parallel to the first link 33 tends to displace rightward. However, since the first link 33 as a whole displaces to the left and the contact portion 4 also displaces to the left, the rightward displacement and the leftward displacement are canceled each other at the contact portion 4. Therefore, the right end 70 slightly displaces in the Y-axis direction (upper-lower direction), but does not substantially displace in the X-axis direction. Since the Y-axis direction is the same as a direction in which the electrodes 2A, 2B are pressed against the workpiece W1, the contact portion 4 smoothly makes a linear contact with the workpiece W1 without the right end 70 getting stuck on the surface of the workpiece W1.

When the electrode 2A, 2B is moved away from the workpiece W1 after a predetermined heating, the four-bar linkage 7 (FIG. 4) is operated by the urging force of the plate springs 38A, 38B, and the electrode holder 5 returns to the standby position.

As described above, the single side heating apparatus 1 according to the first embodiment includes the base portion 3, the pair of electrodes 2A, 2B each having the contact portion 4, the electrode holders 5, four-bar linkages 7 each provided between the base portion 3 and the electrode holder 5 and configured to rotate to tilt the electrode holder 5 around the axis O1 orthogonal to the direction in which the contact portion 4 extends, by a reaction force received by the electrode 2A, 2B from the workpiece W1. Further, each of the four-bar linkages 7 is configured such that the first link 33 located closer to the electrode holder 5 is shorter than the second link 34 located closer to the base portion 3 and the third link 35 and the fourth link 36 are equal in length.

According to the first embodiment, when one end of the contact portion 4 makes a point contact with the workpiece W1, the center of tilting movement of the electrode 2A, 2B is located proximate to the center of the contact portion 4, so that the one end of the contact portion 4 displaces substantially in the upper-lower direction only. Therefore, the contact portion 4 properly makes a linear contact with the workpiece W1 without the one end of the contact portion 4 getting stuck on the surface of the workpiece W1.

Further, use of the four-bar linkages 7 can provide a structure that is excellent in assembly with reduced number of parts.

Thanks to the urging means 8 configured to urge the electrode holder 5 toward the standby position, the electrodes 2A, 2B are caused to return to the original neutral position with ease. Further, it is possible to keep the electrode 2A, 2B stably in contact with the workpiece W1.

Second Embodiment

With reference to FIGS. 9 to 14, a second embodiment will be described.

The single side heating apparatus 1 according to the second embodiment includes a base portion 3, a pair of electrodes 2A, 2B each having a contact portion 4, a pair of electrode holders 5 to which the pair of electrodes 2A, 2B are fixed, and cam mechanisms 9.

<Base Portion 3>

Since the configuration of the base portion 3 is the same as that of the first embodiment, the same reference numeral is used for the base portion and the description thereof will be omitted.

<Electrodes 2A, 2B and Electrode Holders 5>

Since the configuration of the electrodes 2A, 2B is the same as that of the first embodiment, the same reference numerals are used for the electrodes and the description thereof will be omitted. Further, since the configuration of the electrode holder 5 is the same as that of the first embodiment except that the second link base 23 according to the first embodiment is not provided, the same reference numeral is used for the electrode holder and the description thereof will be omitted.

<Cam Mechanism 9>

A cam mechanism 9 is provided between the base portion 3 and an electrode holder 5. The cam mechanism 9 is configured to rotate to tilt the electrode holder 2A, 2B around an axis O2 passing through a center of each of the contact portions 4 and orthogonal to a direction in which the contact portion 4 extends (extension direction of the contact portion 4) by a reaction force received by the electrode 2A, 2B from the workpiece W1. The cam mechanism 9 includes a cam plate 41 having a cam surface 40 formed of an arc-shaped surface extending around the axis O2, and roller followers 42A, 42B configured to come into contact with the cam surface 40.

Each of the rod holder 13 has a lower surface, to which the cam plate 41 is bolted with bolts 43 with the direction of its thickness aligned with the front-rear direction. The cam plate 41 has a lower surface, at which the cam surface 40 formed of an arc-shaped surface extending around the axis O2 located at a center of the contact portion 4 is formed.

The electrode holder 5 has an upper surface, to which a knuckle 45 is bolted with bolts 46 with an insulating plate 44 interposed therebetween. The knuckle 45 has a substantially rectangular prism shape and includes a cam receiving chamber 47; the cam receiving chamber 47 opens at an upper portion and right and left portions thereof. The roller followers 42A, 42B are pivotably supported by a pair of right and left cam shafts 48, 49 to rotate around the cam shafts 48, 49. The cam shafts 48, 49 extend through the cam receiving chamber 47 in the front-rear direction at the lower portion of the cam receiving chamber 47. When the cam plate 41 is inserted into the upper portion of the cam receiving chamber 47, the cam surface 40 comes into contact with the roller followers 42A, 42B. The roller followers 42A, 42B are in contact with portions closer to the right end and the left end of the cam surface 40.

In order to support the weight of the knuckle 45 by the cam plate 41, the cam plate 41 has an arc-shaped long hole 50 formed to extend around the axis O2. Meanwhile, the knuckle 45 is provided with a hinge pin 52; the hinge pin 52 extends in the front-rear direction through a roller bracket 51. A roller follower 53 such as a bearing is pivotably supported by the hinge pin 52 to rotate around the hinge pin 52 so as to be positioned within the long hole 50. The knuckle 45 has a relief hole 54, in which a part of the roller bracket 51 and a distal portion of the hinge pin 52 are disposed.

As described above, the lower end of the roller follower 53 comes into contact with the lower hole surface of the long hole 50 so that the weight of the knuckle 45 is supported by the cam plate 41. Further, since the roller follower 53 moves within the arc-shaped long hole 50 around the axis O2, the roller followers 42A, 42B roll on the cam surface 40 without fail.

A pair of right and left anti-rotation members 55 are provided between the pair of front and rear knuckles 45. Providing the anti-rotation members 55 can prevent the piston rods 17 from rotating around the vertical axis; in other words, the rotation of the electrodes 2A, 2B around the vertical axis can be prevented.

<Urging Means 8>

The single side heating apparatus 1 according to the second embodiment also includes an urging means 8 configured to urge an electrode holder 5 toward the standby position. The urging means 8 according to the second embodiment is formed of a pair of right and left coil springs 56A, 56B. A side cover 57 is bolted to a right side surface and a left side surface of the knuckle 45 with bolts 58. One end of each coil spring 56A, 56B is attached to the side cover 57, while the other end thereof is inserted into a spring receiving hole 59 formed in each right side surface and left side surface of the cam plate 41.

The single side heating apparatus 1 according to the second embodiment is configured as described above, and as seen in FIG. 14, if the right end 70 of the electrode 2A, 2B receives a reaction force from the workpiece W1, the roller followers 42A, 42B roll on the cam surface 40 to move toward the left from a position shown in phantom lines to a position shown in solid lines against the urging force of the coil spring 56B (see FIG. 11), so that the electrode 2A, 2B rotate to tilt around the axis O2. Since the axis O2 is located at a center of the contact portion 4, almost no displacement occurs in the X-axis direction at the right end 70 and only a slight displacement in the Y-axis direction (upper-lower direction) occurs. Since the Y-axis direction is the same as a direction in which the electrode 2A, 2B is pressed against the workpiece W1, the contact portion 4 smoothly makes a linear contact with the workpiece W1 without the right end 70 getting stuck on the surface of the workpiece W1.

When the electrode 2A, 2B is moved away from the workpiece W1 after a predetermined heating, the roller followers 42A, 42B return to the original positions by the urging force of the coil springs 56A, 56B, and the electrode holder 5 returns to the standby position.

As described above, the single side heating apparatus 1 according to the second embodiment includes the base portion 3, the pair of electrodes 2A, 2B each having the contact portion 4, the electrode holders 5, cam mechanisms 9 each provided between the base portion 3 and the electrode holder 5 and configured to rotate to tilt the electrode holder 2A, 2B around the axis O2 passing through a center of the contact portion 4 and orthogonal to the direction in which the contact portion 4 extends, by a reaction force received by the electrode 2A, 2B from the workpiece W1. Further, each of the cam mechanisms 9 includes the cam plate 41 having the cam surface 40 formed of an arc-shaped surface extending around the axis O2, and the roller followers 42A, 42B configured to come into contact with the cam surface 40.

According to the second embodiment, when one end of the contact portion 4 makes a point contact with the workpiece W1, the center of tilting movement of the electrode 2A, 2B is located at a center of the contact portion 4, so that the one end of the contact portion 4 displaces substantially in the upper-lower direction only. Therefore, the contact portion 4 properly makes a linear contact with the workpiece W1 without the one end of the contact portion 4 getting stuck on the surface of the workpiece W1.

Further, use of the cam mechanisms 9 can provide a structure that is excellent in assembly.

Preferred embodiments of the present invention have been described above. In the above embodiments, the single side heating apparatus 1 includes two piston rods 17 to allow the electrodes 2A, 2B to move independently in the upper-lower direction. The single side heating apparatus 1 further includes a pair of four-bar linkages or a pair of cam mechanisms 9 corresponding to each of the electrodes 2A, 2B. However, the single side heating apparatus 1 may include only one four-bar linkage 7 or only one cam mechanism 9 to adjust the position of the electrodes 2A, 2B at the same time.

DESCRIPTION OF REFERENCE NUMERALS 1 single side heating apparatus
2A, 2B electrode
3 base portion
4 contact portion
5 electrode holder
7 four-bar linkage
8 urging means
9 cam mechanism
24A, 24B link
40 cam surface
41 cam plate
42A, 42B roller follower
W1, W2 workpiece

The invention claimed is:

1. A single side heating apparatus equipped with a pair of electrodes for heating a workpiece from one side of the workpiece, the apparatus comprising:
   a base portion;
   the pair of electrodes each having a contact portion configured to contact with the workpiece in one direction, the contact portion having a single continuous contact surface or a plurality of spaced-apart contact surfaces;
   an electrode holder, to which the pair of electrodes are fixed; and
   a four-bar linkage provided between the base portion and the electrode holder and configured to rotate to tilt the electrode holder around an axis orthogonal to the one direction by a reaction force received by the electrodes from the workpiece,
   wherein the four-bar linkage comprises a first link located closer to the electrode holder, a second link located closer to the base portion, a third link, and a fourth link, the first link being shorter than the second link, and the third link and the fourth link being equal in length.

2. A single side heating apparatus equipped with a pair of electrodes for heating a workpiece from one side of the workpiece, the apparatus comprising:
   a base portion;
   the pair of electrodes each having a contact portion configured to contact with the workpiece in one direction, the contact portion having a single continuous contact surface or a plurality of spaced-apart contact surfaces;
   an electrode holder, to which the pair of electrodes are fixed; and
   a cam mechanism provided between the base portion and the electrode holder and configured to rotate to tilt the electrode holder around an axis passing through a center of each of the contact portions and orthogonal to the one direction by a reaction force received by the electrodes from the workpiece, wherein the cam mechanism comprises a cam plate having a cam surface formed of an arc-shaped surface extending around the axis, and a roller follower configured to come into contact with the cam surface.

3. The single side heating apparatus according to claim 1, further comprising a spring configured to urge the electrode holder toward a standby position.

4. The single side heating apparatus according to claim 1, wherein the electrode holder comprises a pair of electrode holders corresponding to the pair of electrodes, and wherein the four-bar linkage comprises a pair of four-bar linkages provided between the base portion and the pair of electrode holders.

5. The single side heating apparatus according to claim 2, wherein the electrode holder comprises a pair of electrode holders corresponding to the pair of electrodes, and wherein the cam mechanism comprises a pair of cam mechanisms provided between the base portion and the pair of electrode holders.

6. The single side heating apparatus according to claim 4, further comprising a spring configured to urge the electrode holder toward a standby position.

7. The single side heating apparatus according to claim 2, further comprising a spring configured to urge the electrode holder toward a standby position.

8. The single side heating apparatus according to claim 5, further comprising a spring configured to urge the electrode holder toward a standby position.

\* \* \* \* \*